US008821298B2

(12) United States Patent
Osawa et al.

(10) Patent No.: US 8,821,298 B2
(45) Date of Patent: Sep. 2, 2014

(54) GAME SYSTEM, GAME METHOD, GAME DEVICE, AND STORAGE MEDIUM STORING GAME PROGRAM

(75) Inventors: Toru Osawa, Kyoto (JP); Keisuke Kikuchi, Tokyo (JP); Makoto Shibata, Tokyo (JP)

(73) Assignee: Nintendo Co., Ltd., Kyoto (JP)

( * ) Notice: Subject to any disclaimer, the term of this patent is extended or adjusted under 35 U.S.C. 154(b) by 174 days.

(21) Appl. No.: 13/604,690

(22) Filed: Sep. 6, 2012

(65) Prior Publication Data

US 2013/0288805 A1 Oct. 31, 2013

(30) Foreign Application Priority Data

Apr. 26, 2012 (JP) ................................. 2012-101646

(51) Int. Cl.
*A63F 9/24* (2006.01)
*A63F 13/00* (2014.01)
*G06F 17/00* (2006.01)
*G06F 19/00* (2011.01)

(52) U.S. Cl.
USPC ........ 463/43; 463/1; 463/20; 463/25; 463/40; 463/42

(58) Field of Classification Search
USPC ................................ 463/1, 20, 25, 40, 42, 43
See application file for complete search history.

(56) References Cited

PUBLICATIONS

Operations Manual for Wii Software: "Zero—Tsukihami no Kamen", (Jul. 31, 2008), 18 pages.

*Primary Examiner* — Adetokunbo O Torimiro
(74) *Attorney, Agent, or Firm* — Nixon & Vanderhye P.C.

(57) ABSTRACT

A game system capable of determining, and reflecting in games contents, nervousness of a player due to fear or the like is provided. A game device main body 110 performs the game processing based on an operation of the player on the first controller 121, and calculates, in a scene of a game, a nervousness parameter indicating the degree of nervousness of the player in the scene based on an operation of the player on the first controller 121. Specifically, the game device main body 110 calculates the nervousness parameter in such a way that the degree of nervousness increases according to the number of operations of the player on the first controller 121 that are irrelevant to the progress of the game, or the like, and causes the nervousness parameter to be reflected in the game processing.

28 Claims, 11 Drawing Sheets

GAME SYSTEM, GAME METHOD, GAME DEVICE, AND STORAGE MEDIUM STORING GAME PROGRAM

CROSS REFERENCE TO RELATED APPLICATION

The disclosure of Japanese Patent Application No. 2012-101646, filed on Apr. 26, 2012, is incorporated herein by reference.

FIELD

This specification discloses a game system, a game method, a game device, and a storage medium having stored therein a game program, which are for performing game processing.

BACKGROUND AND SUMMARY

Conventionally, horror games which use horror effects in various scenes of the games are known. In such a horror game, as a player manipulates a player character in the game and moves on in a virtual space, the scene progresses and horror effects using images and sound are created according to the progress of the scenes, for example.

With a conventional horror game, however, since whether a player playing the game actually felt scared is not grasped, control cannot be performed in accordance with the actual perception of fear of the player.

A game system of an example embodiment is a game system performing game processing based on an operation of a player on an operation device including an operating member, including: a game processor for performing the game processing baaed on an operation of the player on the operation device; and a parameter calculator for calculating, in a scene of a game, a parameter indicating a degree of nervousness of the player in the scene based on an operation of the player on the operating member, wherein the parameter calculator or calculates the parameter in such a way that the degree of nervousness increases according to the number or predetermined operations of the player on the operating member, the number of operations of the player on the operating member that are irrelevant to progress of the game, and/or, in a case an event requiring a predetermined operation on the operating member occurs, time from the occurrence of the event to performance of the corresponding predetermined operation, and wherein the game processor reflects the parameter in the game processing.

According to this configuration, the degree of nervousness of a player is determined based on an operation of the player on the operating member of the operation device, and is reflected in the game processing. For example, in a case the player repeatedly, blindly presses, in a scene of a game, an operating member irrelevant to progress of the game, this is determined as the nervousness of the player. The "nervousness" here is the psychological nervousness of the player, and means loss of composure of the player due to feelings such as fear, fright, surprise, panic, anxiety, and the like.

A game system of another example embodiment is a game system performing game processing baaed on an operation of a player on an operation device including an accelerometer, including: a game processor for performing the game processing based on an operation of the player on the operation device; and a parameter calculator for calculating, in a scene of a game, a parameter indicating a degree of nervousness of the player in the scene based on acceleration detected by the accelerometer, wherein the parameter calculator calculates the parameter in such a way that the degree of nervousness increases according to the number of times acceleration equal to or exceeding a predetermined threshold value is detected with respect to a predetermined direction, and/or magnitude of detected acceleration in at predetermined direction, and wherein the game processor reflects the parameter in the game processing.

According to this configuration, the degree of nervousness of a player is determined based on acceleration detected by the accelerometer of the operation device, and is reflected in the game processing. For example, in a case there is nervousness such as shaking of the player's hands holding the operation device due to fear, fright, surprise or the like in a scene of a game, this nervousness may be detected and be reflected in the game processing.

A game system of still another example embodiment is a game system performing game processing based on an operation of a player on an operation device, including: a game processor for performing the game processing based on an operation of the player on the operation device; a biometric information acquisition section for acquiring biometric information of the player; and a parameter calculator for calculating, in a scene of a game, a parameter indicating a degree of nervousness of the player in the scene based on the biometric information acquired by the biometric information acquisition section, wherein the parameter calculator calculates the parameter in such a way that the degree of nervousness increases according to an amount of change in the biometric information acquired by the biometric information acquisition section, and wherein the game processor reflects the parameter in the game processing.

According to this configuration, the degree of nervousness of a player is determined based on biometric information detected by the biometric information acquisition section, and is reflected in the game processing.

In the game system described above, the biometric information acquisition section may be a plethysmograph, and the parameter calculator may calculate the parameter in such a way that the degree or nervousness increases in a case an amount of change in amplitude and/or in a frequency of a pulse wave is great.

According to this configuration, if the pulse of a player becomes irregular due to fear, fright, surprise or the like in a scene of a game, this can be determined as the nervousness of the player.

A game system of still another example embodiment is a game system performing game processing based on an operation of a player on an operation device, including: a game processor for performing the game processing based on an operation of the player on the operation device; a camera for image-capturing the player and generating an image; and a parameter calculator for calculating, in a scene of a game, a parameter indicating a degree of nervousness of the player in the scene based on the image generated by the camera, wherein the game processor reflects the parameter in the game processing.

According to this configuration, an image of a player is generated by the camera and the degree of nervousness of the player is determined based on the image, and this is reflected in the game processing. For example, if the player lurches backward with fear in a scene of a game, such movement of the player can be determined as the nervousness of the player.

A game system of still another example embodiment is a game system performing game processing based on an operation of a player on an operation device, including: a game processor for performing the game processing based on an operation of the player on the operation device; a microphone for acquiring a voice; and a parameter calculator for calculating, in a scene of a game, a parameter indicating a degree of nervousness of the player in the scene based on the voice acquired by the microphone, wherein the parameter calculator calculates the parameter an such a way that the degree of nervousness increases according to volume and/or an amount of change in the voice acquired by the microphone, and wherein the game processor reflects the parameter in the game processing.

According to this configuration, the voice of a player is acquired by the microphone and the degree of nervousness of the player is determined based on the volume and/or the amount of change in the voice, and this is reflected in the game processing. For example, if the player involuntarily cries out with fear or surprise in a scene of a game, this voice can be determined as the nervousness of the player.

A game system of still another example embodiment is a game system performing game processing based on an operation of a player on a touch sensor, including: a game processor for performing the game processing based on an operation of the player on the touch sensor; and a parameter calculator for calculating, in a scene of a game, a parameter indicating a degree of nervousness of the player an the scene based on contact detected by the touch sensor, wherein the parameter calculator calculates the parameter in such a way that the degree of nervousness increases according to the number of predetermined operations of the player on the touch sensor, the number of operations of the player on the touch sensor that are irrelevant to progress of the game, and/or, in a case an event requiring a predetermined operation on the touch sensor occurs, time from the occurrence of the event to performance of the corresponding predetermined operation, and wherein the game processor reflects the parameter in the game processing.

According to this configuration, the degree of nervousness of a player is determined baaed on an operation of the player on the touch sensor, and this is reflected in the game processing. For example, if the player repeatedly, blindly touches the touch sensor in a scene of a game, this is determined as the nervousness of the player.

In the game system described above, the game processor may perform predetermined processing according to magnitude of the degree of nervousness indicated by the parameter.

According to this configuration, for example, in a case the degree of nervousness of a player is high, processing according to the nervousness is performed. For example, the game processor may decrease the life points of a player character according to the degree of nervousness of the player, or, in a case the degree or nervousness of the player equals or exceeds a predetermined threshold value at a predetermined timing, an event may occur in the scene of the game.

In the game system described above, the game processor may cause a diagnosis result of the player regarding nervousness to be presented based on the parameter.

According to this configuration, the extent of the nervousness of a player during a game can be recognized. The diagnosis result may be presented at the end of the game as an indicator indicating how easily the player becomes nervous, for example.

In the game system described above, the game processor may store an image of a scene where the player is determined to have become nervous based on the parameter.

According to this configuration, an image of the scene where a player became nervous can be checked. This image may be an image of the scene where the player was the most nervous in the game, for example. Also, this image may be presented to the player at the end of the game. The player can thereby recognize the scene, in the series of scenes of the game, where he/she became the most nervous.

A game processing method of an example embodiment is a game processing method for performing game processing based on an operation of a player on an operation device including an operating member, including: performing the game processing based on an operation of the player on the operation device; and calculating, in a scene of a game, a parameter indicating a degree of nervousness of the player in the scene based on an operation of the player on the operating member, wherein the calculating step calculates the parameter in such a nay that the degree of nervousness increases according to the number of predetermined operations of the player on the operating member, the number of operations of the player on the operating member that are irrelevant to progress of the game, and/or, in a case an event requiring a predetermined operation on the operating member occurs, time from the occurrence of the event to performance of the corresponding predetermined operation, and wherein toe performing step reflects the parameter in the game processing.

A game processing method of another example embodiment is a game processing, method for performing game processing based on an operation of a player on an operation, device including an accelerometer, including: performing the game processing based on an operation of the player on the operation device; and calculating, in a scene of a game, a parameter indicating a degree of nervousness of the player in the scene based on acceleration detected by the accelerometer, wherein the calculating step calculates the parameter in such a way that the degree of nervousness increases according to the number of times acceleration equal to or exceeding a predetermined threshold value is defected with respect to a predetermined direction, and/or magnitude of detected acceleration in a predetermined direction, and wherein the performing step reflects the parameter in the game processing.

A game processing method of still another example embodiment is a game processing method for performing game processing based on an operation of a player on an operation device, including: performing the game processing based on an operation of the player on the operation device; acquiring biometric information of the player; and calculating, in a scene of a game, a parameter indicating a degree of nervousness of the player in the scene based on the biometric information acquired in the acquiring step, wherein the calculating step calculates the parameter in such a way that the degree of nervousness increases according to an amount of change in the biometric information acquired in the acquiring step, and wherein the performing step reflects the parameter in the game processing.

A game processing method, of still another example embodiment, is a game processing method for performing game processing based on an operation of a player on an operation device, including: performing the game processing based on an operation of the player on the operation device; image-capturing the player and generating an image; and calculating, in a scene of a game, a parameter indicating a degree of nervousness of the player in the scene based on the image generated in the image-capturing step, wherein the performing step reflects the parameter in the game processing.

A game processing method of still another example embodiment is a game processing method for performing game processing based on an operation of a player on an operation device, including: performing the game processing based on an operation of the player on the operation device; acquiring a voice; and calculating, in a scene of a game, a parameter indicating a degree of nervousness of the player in the scene based on the voice acquired in the acquiring step, wherein the calculating step calculates the parameter in such a way that the degree of nervousness increases according to volume and/or an amount of change in the voice acquired in the acquiring step, and wherein the performing step reflects the parameter in the game processing.

A game processing method of still another example embodiment is a game processing method for performing game processing based on an operation of a player on an operation device including a touch sensor, including: performing the game processing based on an operation of the player on the operation device; and calculating, in a scene of a game, a parameter indicating a degree of nervousness of the player in the scene based on contact detected by the touch sensor, wherein the calculating step calculates the parameter in such a way that the degree of nervousness increases according to the number of predetermined operations of the player on the touch sensor, the number of operations of the player on the touch sensor that are irrelevant to progress of the game, and/or, in a case an event requiring a predetermined operation on the touch sensor occurs, time from the occurrence of the event to performance of the corresponding predetermined operation, and wherein the performing step reflects the parameter in the game processing.

A game device of an example embodiment is a game device performing game processing based on an operation of a player on an operation section including an operating member, including: a game processor for performing the game processing based on an operation of the player on the operation section; and a parameter calculator for calculating, in a scene of a game, a parameter indicating a degree of nervousness of the player in the scene based on an operation of the player on the operating member, wherein the parameter calculator calculates the parameter in such a way that the degree of nervousness increases according to the number of predetermined operations of the player on the operating member, the number of operations of the player on the operating member that are irrelevant to progress of the game, and/or, in a case an event requiring a predetermined operation on the operating member occurs, time from the occurrence of the event to performance of the corresponding predetermined operation, and wherein the game processor reflects the parameter in the game processing.

A game device of another example embodiment is a game device performing game processing based on an operation of a player on an operation section including an accelerometer, including: a game processor for performing the game processing based on an operation of the player on the operation section; and a parameter calculator for calculating, in a scene of a game, a parameter indicating a degree of nervousness of the player in the scene based on acceleration detected by the accelerometer, wherein the parameter calculator calculates the parameter in such a way that the degree of nervousness increases according to the number of times acceleration equal to or exceeding a predetermined threshold value is detected with respect to a predetermined direction, and/or magnitude of detected acceleration in a predetermined direction, and wherein the game processor reflects the parameter in the game processing.

A game device of still another example embodiment is a game device performing game processing based on an operation of a player on an operation section, including: a game processor for performing the game processing based on an operation of the player on the operation section; a biometric information acquisition section for acquiring biometric information of the player; and a parameter calculator for calculating, in a scene of a game, a parameter indicating a degree of nervousness of the player in the scene based on the biometric information acquired by the biometric information acquisition section, wherein the parameter calculator calculates the parameter in such a way that the degree of nervousness increases according to an amount of change in the biometric information acquired by the biometric information acquisition section, and wherein the game processor reflects the parameter in the game processing.

A game device of still another example embodiment is a game device performing game processing based on an operation of a player on an operation section, including: a game processor for performing the game processing based on an operation of the player on the operation section; a camera for image-capturing the player and generating an image; and a parameter calculator for calculating, in a scene of a game, a parameter indicating a degree of nervousness of the player in the scene based on the image generated by the camera, wherein the game processor reflects the parameter in the game processing.

A game device of still another example embodiment is a game device performing game processing based on an operation of a player on an operation section, including: a game processor for performing the game processing based on an operation of the player on the operation section; a microphone for acquiring a voice; and a parameter calculator for calculating, in a scene of a game, a parameter indicating a degree of nervousness of the player in the scene based on the voice acquired by the microphone, wherein the parameter calculator calculates the parameter in such a way that the degree of nervousness increases according to volume and/or an amount of change in the voice acquired by the microphone, and wherein the game processor reflects the parameter in the game processing.

A game device of still another example embodiment is a game device performing game processing based on an operation of a player on a touch sensor, including: a game processor for performing the game processing based on an operation of the player on the touch sensor; and a parameter calculator for calculating, in a scene of a game, a parameter indicating a degree of nervousness of the player in the scene based on contact detected by the touch sensor, wherein the parameter calculator calculates the parameter in such a way that the degree of nervousness increases according to the number of predetermined operations of the player on the touch sensor, the number of operations of the player on the touch sensor that are irrelevant to progress of the game, and/or, in a case an event requiring a predetermined operation on the touch sensor occurs, time from the occurrence of the event to performance of the corresponding predetermined operation, and wherein the game processor reflects the parameter of the game processing.

A storage medium of an example embodiment having stored therein a game program causing a computer of a game device performing game processing baaed on an operation of a player on an operation device including an operating member to function as: a game processor for performing the game processing based on an operation of the player on the operation device; and a parameter calculator for calculating, in a scene of a game, a parameter indicating a degree of nervousness of the player in the scene based on an operation of the player on the operating member, wherein the parameter calculator calculates the parameter in such a way that the degree of nervousness increases according to the number of predetermined operations of the player on the operating member, the number of operations of the player on the operating member that are irrelevant to progress of the game, and/or, in a case an event requiring a predetermined operation on the operating member occurs, time from the occurrence of the event to performance of the corresponding predetermined operation, and wherein the game processor reflects the parameter in the game processing.

A storage medium of another example embodiment having stored therein a game program causing a computer or a game device performing game processing based on an operation of a player on an operation device including an accelerometer to function as: a game processor for performing the game processing based on an operation of the player on the operation device; and a parameter calculator for calculating, in a scene of a game, a parameter indicating a degree of nervousness of the player in the scene based on acceleration detected by the accelerometer, wherein the parameter calculator calculates the parameter in such a way that the degree of nervousness increases according to the number of times acceleration equal to or exceeding a predetermined threshold value is detected with respect to a predetermined direction, and/or magnitude of detected acceleration in a predetermined direction, and wherein the game processor reflects the parameter in the game processing.

A storage medium of still another example embodiment having stored therein a game program ceasing a computer of a game device performing game processing based on an operation of a player on an operation device to function as: a game processor for performing the game processing based on an operation of the player on the operation device; a biometric information acquisition section for acquiring biometric information of the player; and a parameter calculator for calculating, in a scene of a game, a parameter indicating a degree of nervousness of the player in the scene based on the biometric information acquired by the biometric information acquisition section, wherein the parameter calculator calculates the parameter in such a way that the degree of nervousness increases according to an amount of change in the biometric information acquired by the biometric information acquisition section and wherein the game processor reflects the parameter in the game processing.

A storage medium of still another example embodiment having stored therein a game program causing a computer of a game device performing game processing based on an operation of a player on an operation device to function as: a game processor for performing the game processing based on an operation of the player on the operation device; a camera for image-capturing the player and generating an image; and a parameter calculator for calculating, in a scene of a game, a parameter indicating a degree of nervousness of the player in the scene based on the image generated by the camera, wherein the game processor reflects the parameter in the game processing.

A storage medium of still another example embodiment having stored therein a game program causing a computer of a game device performing game processing based on an operation of a player on an operation device to function as: a game processor for performing the game processing based on an operation of the player on the operation device; a microphone for acquiring a voice; and a parameter calculator for calculating, in a scene of a game, a parameter indicating a degree of nervousness of the player in the scene based on the voice acquired by the microphone, wherein the parameter calculator calculates the parameter in such a way that the degree of nervousness increases according to volume and/or an amount of change in the voice acquired by the microphone, and wherein the game processor reflects the parameter in the game processing.

A storage medium of still another example embodiment having stored therein a game program causing a computer of a game device performing game processing based on an operation of a player on a touch sensor to function as: a game processor for performing the game processing based on an operation of the player on the touch sensor; and a parameter calculator for calculating, in a scene of a game, a parameter indicating a degree of nervousness of the player in the scene based on contact detected by the touch sensor, wherein the parameter calculator calculates the parameter in such a way that the degree of nervousness increases according to the number of predetermined operations of the player on the touch sensor, the number of operations of the player on the touch sensor that are irrelevant to progress of the game, and/or, in a case an event requiring a predetermined operation on the touch sensor occurs, time from the occurrence of the event to performance of the corresponding predetermined operation, and wherein the game processor reflects the parameter in the game processing.

DETAILED DESCRIPTION OF NON-LIMITING EXAMPLE EMBODIMENTS

Figure 1:
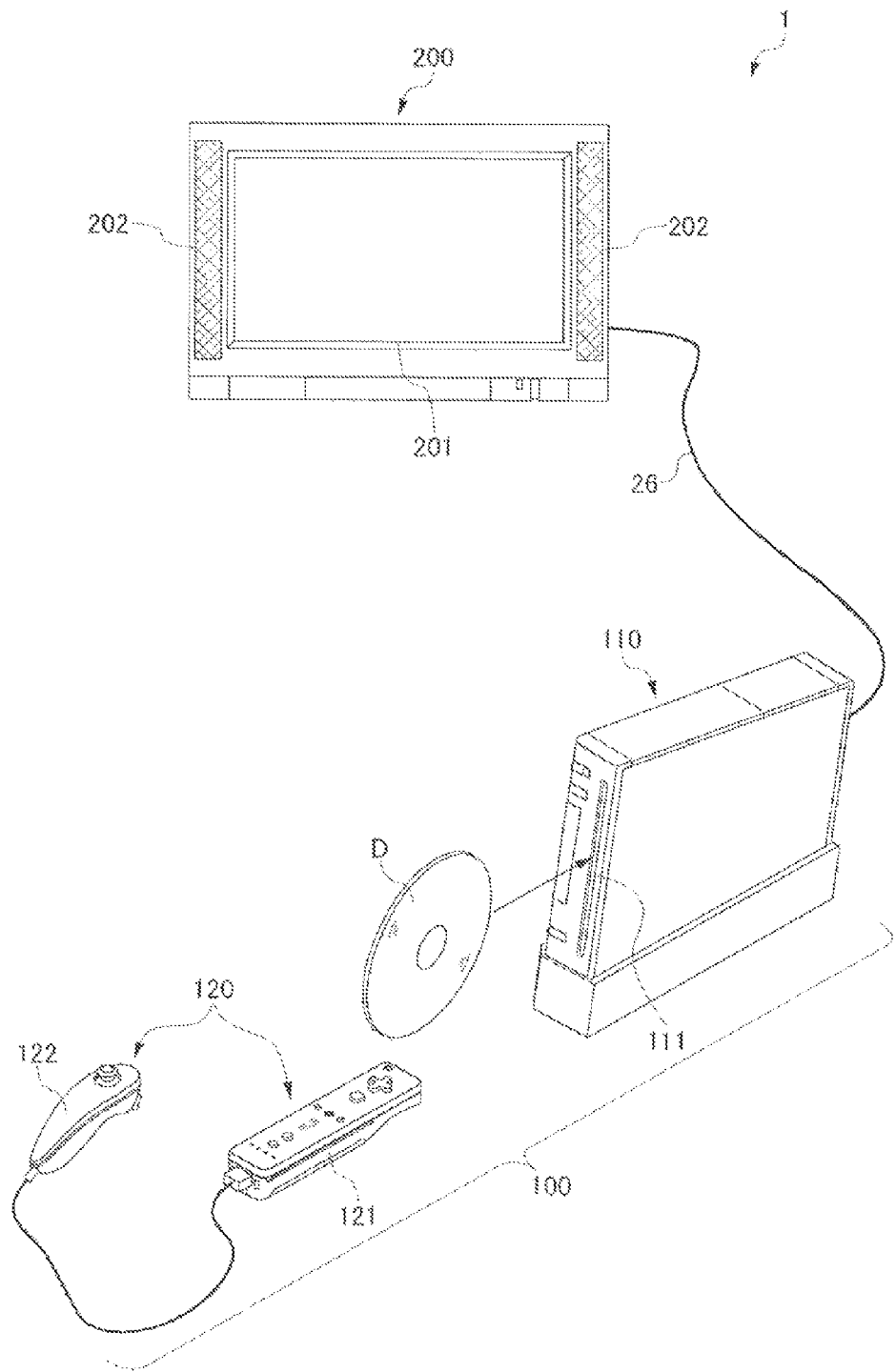
FIG. 1 shows an example non-limiting external appearance of a game system.

FIG. 1 shows an example non-limiting external appearance at a game system. A game system 1 includes a game device 100, and a monitor 200. The game device 100 includes a game device main body 110, and a controller 120. The game device main body 110 is connected to the monitor 200. The controller 120 is composed of a first controller 121 and a second controller 122 that are mutually connected. A disk slot 111 for inserting an optical disk D is formed in the game device main body 110. The monitor 200 includes a screen 201, and a speaker 202.

Controller signals are wirelessly transmitted from the controller 120 to the game device main body 110. The game device main body 110 reads, from the optical disk D, and executes a game program, and performs game processing according to a controller signal wirelessly received from the controller 120. The monitor 200 outputs images on the screen 201 and sound from the speaker 202 according to the game processing performed by the game device main body 110.

Figure 2:
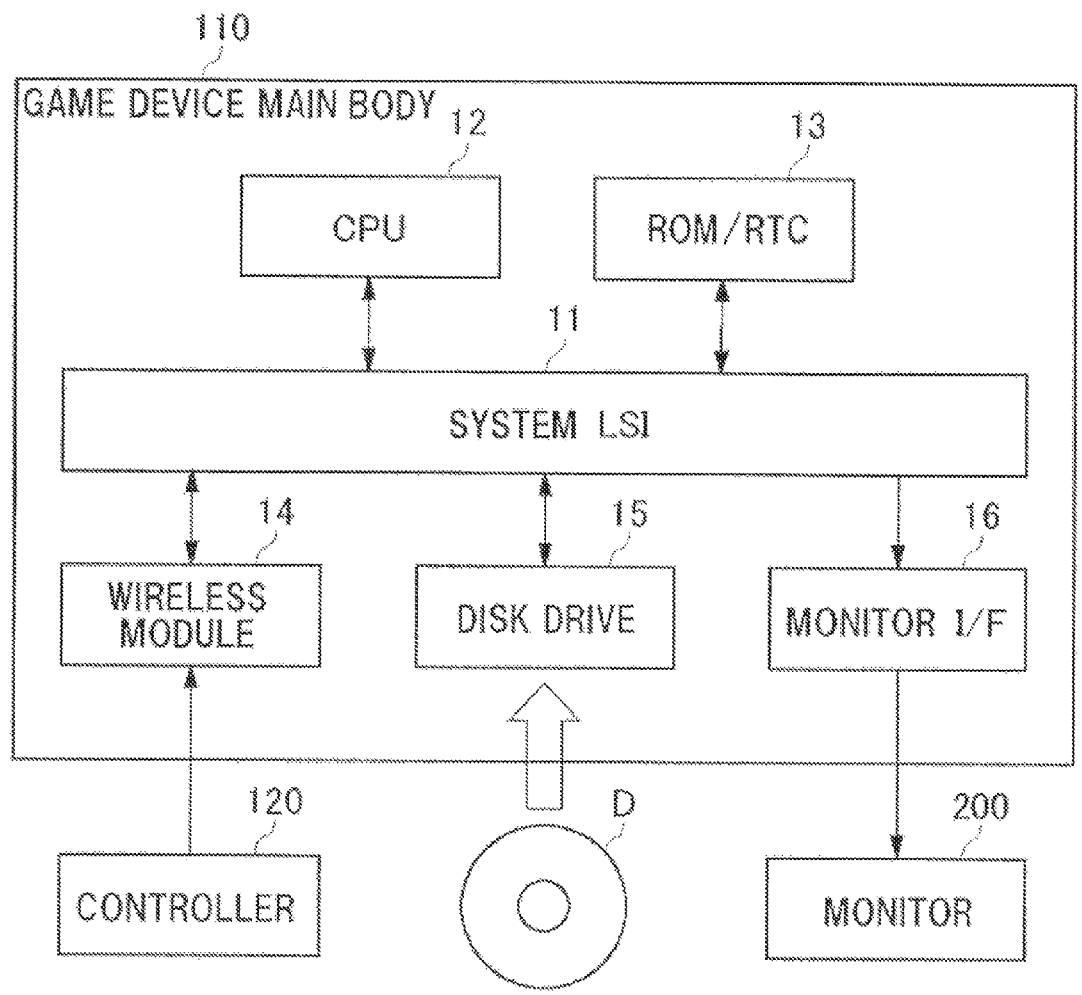
FIG. 2 shows an example non-limiting block diagram showing a configuration of a game device main body.

FIG. 2 shows an example non-limiting block diagram of the game device main body 110. The game device main body 110 includes a system LSI (Large Scale Integration) 11, a CPU (Central Processing Unit) 12, a ROM/RTC (Read Only Memory/Real Time Clock) 13, a wireless module 14, a disk drive 15, and a monitor I/F (interface) 16. The CPU 12, the ROM/RTC 13, the wireless module 14, The disk drive 15, and the monitor I/F 16 are connected to the system LSI 11.

The system LSI 11 performs processes such as control of data transmission between structural elements connected thereto, generation of images to be displayed, acquisition of data from an external device, and the like. The CPU 12 is for performing game processing by executing a game program stored in the optical disk D, and functions as a game processor. The ROM/RTC 13 is configured from a ROM (a boot ROM) in which a startup program for the game device main body 110 is embedded, and a clock circuit RTC for counting time.

The wireless module 14 receives controller signals wirelessly transmitted from the controller 120, and also, wirelessly transmits control signals from the game device main body 110 to the controller 120. The wireless module 14 modulates a carrier of a predetermined frequency by a control signal using short range wireless communication technology such as Bluetooth (registered trademark), and emits a weak radio wave signal. The dish drive 15 reads program data, texture data and the like from the optical disk D, and writes the data which has been read in a memory of the system LSI 11. The monitor I/F 16 outputs signals of images and sound generated by the system LSI 11 to the monitor 200.

Figure 3A:
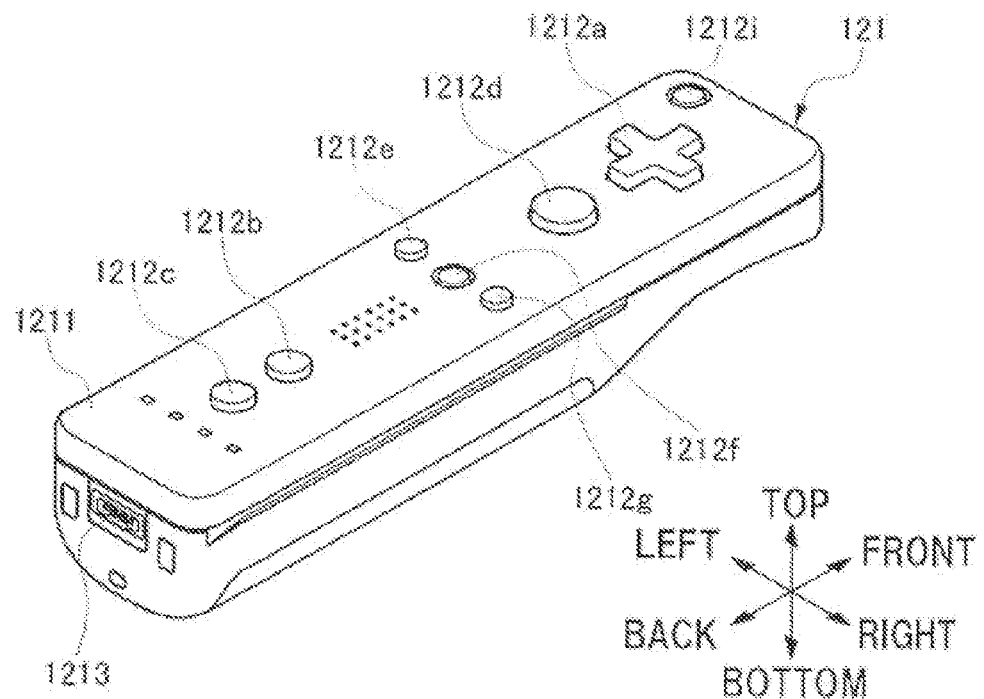
FIG. 3A shows an example non-limiting perspective diagram of a first controller seen from the top rear side.
Figure 3B:
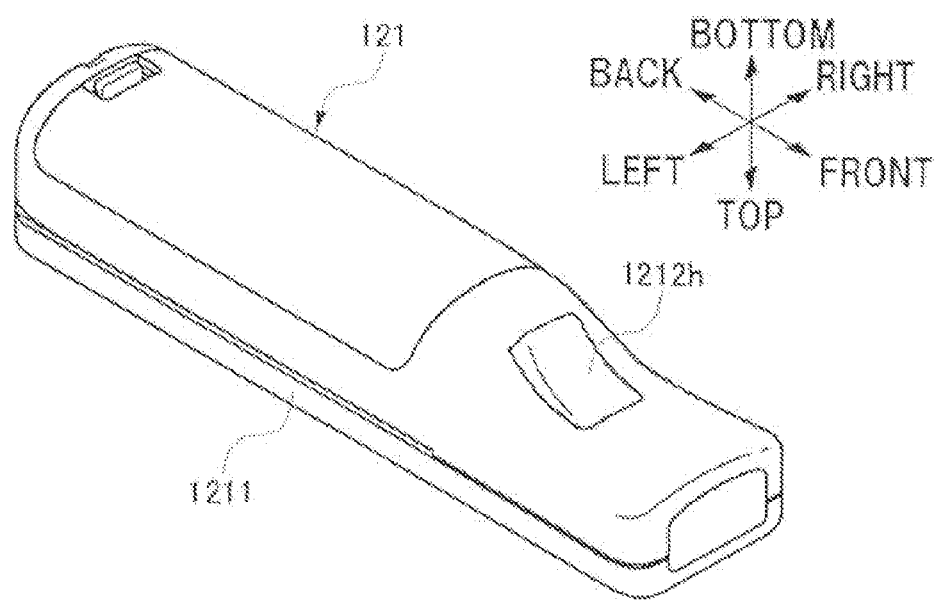
FIG. 3B shows an example non-limiting perspective diagram of the first controller seen from the bottom front side.

FIG. 3A shows an example non-limiting perspective diagram of the first controller seen from the top rear side. FIG. 3B shows an example non-limiting perspective diagram of the first controller seen from the bottom front side. In the following explanation, examples of the front and bank, the top and bottom, and the left and right of the first controller 121 will be according to the examples of FIGS. 3A and 3B. As shown in FIG. 3A, the first controller 121 has a substantially rectangular parallelpiped housing 1211 whose forward/backward direction is the longitudinal direction, and is, as a whole, of a site that allows a grown-up or a child to hold it with one hand.

A plurality of operating members are provided to the housing 1211. That is, on the top surface of the housing 1211, a cross key 1212a, a 1-button 1212b, a 2-button 1212c, an A-button 1212d, a minus (−) button 1212e, a menu button 1212f, and a plus (+) button 1211g are provided as the operating members. A concave portion is formed on the bottom surface of the housing 1211, and a B-button 1212h is provided on a sloping surface at the rear side of the concave portion. Also, a power button 1212i for turning on/off the power of the game device main, body 110 in provided on the top surface of the housing 1211. A connector 1213 capable of connecting the second controller 122 or the like is also provided on the housing 1211 on the rear end surface.

Figure 4A:
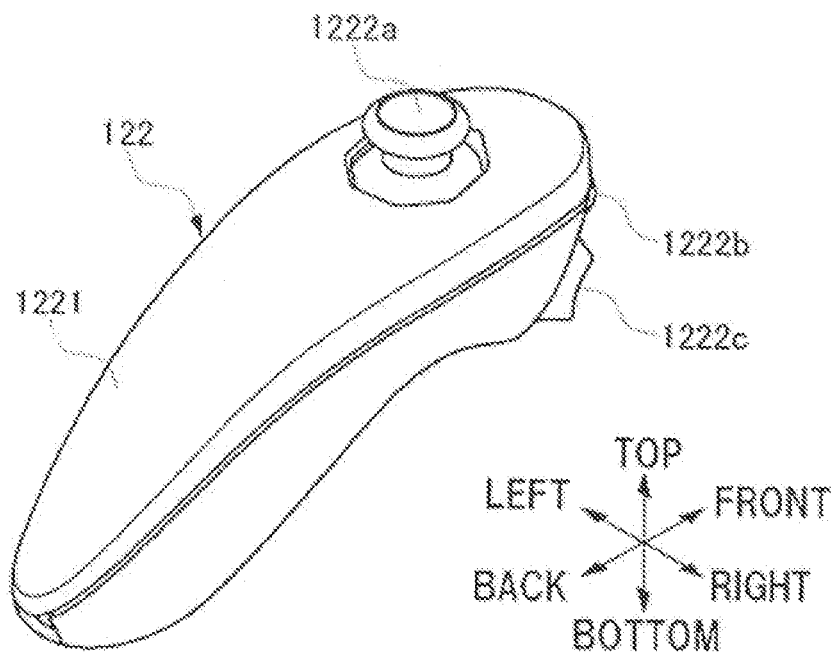
FIG. 4A shows an example non-limiting perspective diagram of a second controller seen from the top rear side.
Figure 4B:
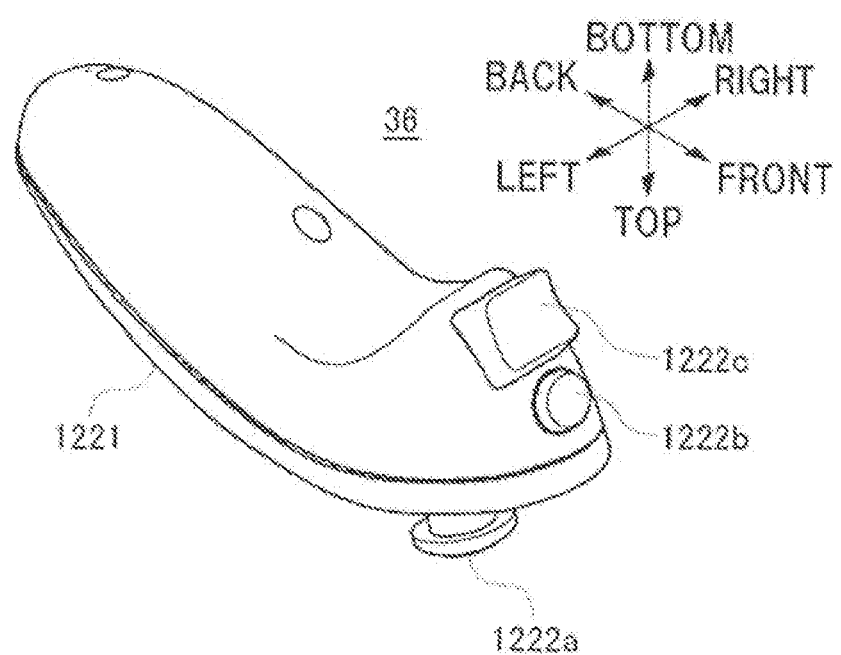
FIG. 4B shows an example non-limiting perspective diagram of the second controller seen from the bottom front side.

FIG. 4A shows an example non-limiting perspective diagram of the second controller seen from the top rear side. FIG. 4B) shows an example non-limiting perspective diagram of the second controller seen from the bottom front side. In the following explanation, examples of the front and back, the top and bottom, and the left and right of the second controller 122 will be according to the examples of FIGS. 4A and 4B. As shown in FIG. 4A, the second controller 122 has a housing 1221. The housing 1221, when viewed from the plan view, has a substantially thin long elliptical shape in the forward/backward direction, and the width in the right/left direction at the rear end is narrower than that of the front end. Also, when viewed from the side, the housing 1221 has, as a whole, a curved shape, and is curved downward from the horizontal portion at the front end toward the rear end.

Like the first controller 121, the housing 1221 is, as a whole, of a size that allows a grown-up or a child to hold it with one hand, but its length in the forward/backward direction is slightly shorter than that of the housing 1211 of the first controller 121. At the front end of the top surface of the housing 1221, an analog joystick 1222a is provided as an operating member. At the front end of the housing 1221, a front end surface slightly sloping toward the back is provided, and a C-button 1222b and a Z-button 1222c arranged in a vertical direction are provided, as operating members, on this front end surface.

Figure 5:
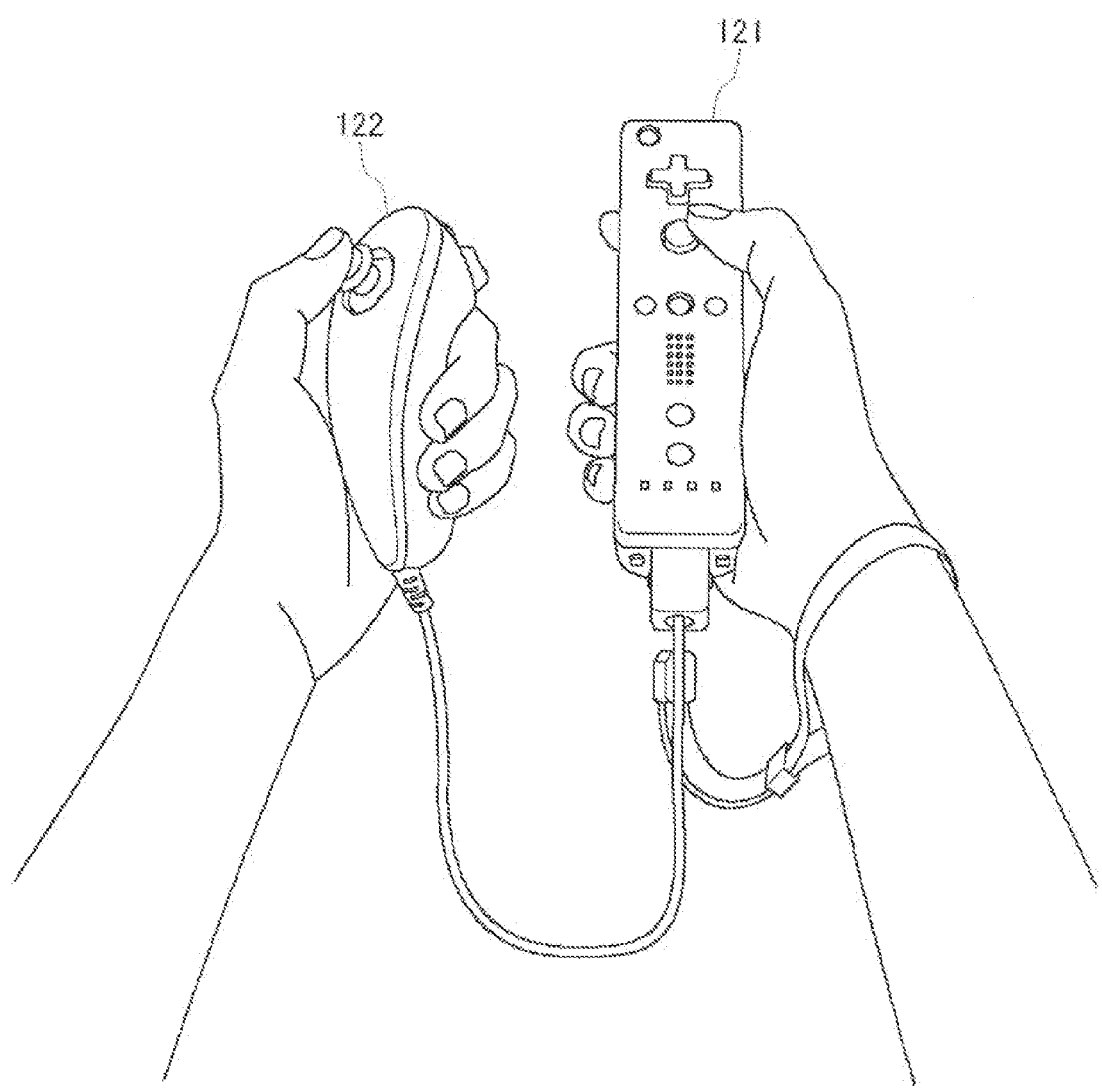
FIG. 5 shows an example non-limiting state at the time of playing a game using a controller.

FIG. 5 shows an example non-limiting state at the time of playing a game using the controller. As shown in FIG. 5, a player holds the first controller in one hand and the second controller in the other hand to thereby operate each controller by one hand. In this state, the cross key 1212a and the A-button 1212d of the first control 121 are positioned near the thumb of one hand, and the B-button 1212h is positioned near the index finger, and the analog joystick 1222a of the second controller 122 is positioned near the thumb of the other hand, and the C-button 1222b and the Z-button 1222c are positioned near the index finger. Therefore, the cross key 1212a, the A-button 1212d, the B-button 1212b, the analog joystick 1222a, the C-button 1222b, and the Z-button 1222c can be easily operated by the thumbs or the index fingers of the left and right hands. Additionally, with the game described below, only the cross key 1212a, the A-button 1212d, the B-button 1212h, end the analog joystick 1222a are needed to progress with the game.

Figure 6:
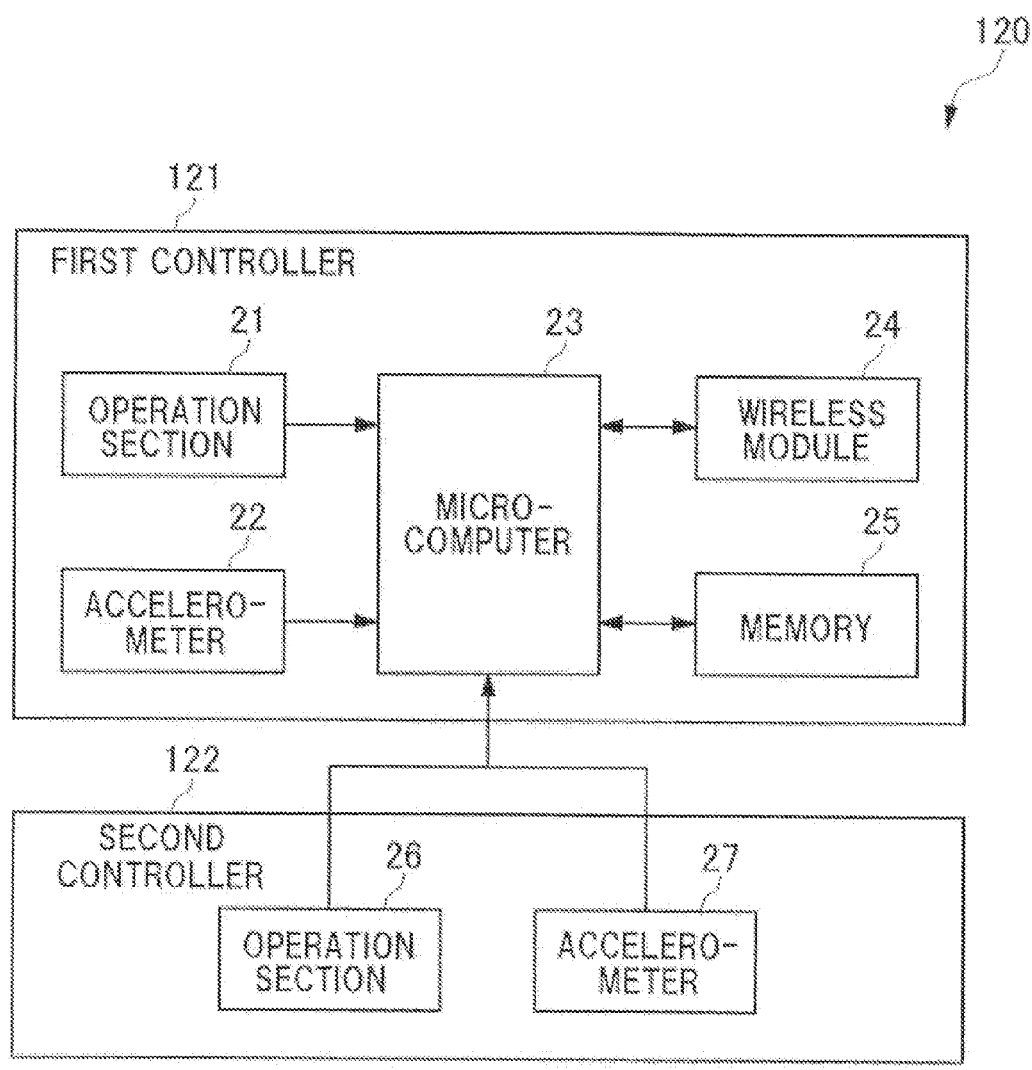
FIG. 6 shows an example non-limiting block diagram showing a configuration of a controller.

FIG. 6 shows an example non-limiting block diagram showing a configuration of the controller 120. As described above, the controller 120 is composed of the first controller 121 and the second controller 122. A connecting wire extending from the second controller is connected to the connector 1213 (see FIG. 3A) of the first controller 121. The first controller is a main controller, and includes an operation section 21, an accelerometer 22, a microcomputer 23, a wireless module 24, a memory 25, and a vibrator (not shown). The second controller 122 is a sub controller, and includes an operation section 26, and an accelerometer 27.

The operation section 21 generates an operation signal according to an operation of a player on the operating member (the cross key 1212a, the buttons 1212b to 1212h) shown in FIGS. 3A and 3B. The accelerometer 22 is a capacitive accelerometer. The first controller 121 detects acceleration in each direction of three axes of an up and down direction, a left and right direction, and a forward and backward direction. The accelerometer 22 detects acceleration in a linear component or gravitational acceleration for each sensing axis, among acceleration applied thereto, and generates an acceleration signal. Additionally, as the accelerometer 22, a two-axis accelerometer that detects acceleration in any two directions of the up and down direction, the left and right direction, and the forward and backward direction may be used, or a one-axis accelerometer may be used.

The operation section 26 of the second controller generates an operation signal according to an operation of the player on the operating member (the analog joystick 1222a, the button 1222b, or the button 1222c) shown in FIG. 4. The accelerometer 27 is a three-axis capacitive accelerometer, and detects acceleration in a linear component or gravitational acceleration for each sensing axis, and generates an acceleration signal.

The microcomputer 23 receives controller signals including the operation signals generated at the operation section 21 and the operation section 26 and the acceleration signals generated at the accelerometer 22 and the accelerometer 27, and, while using the memory 25 as a memory area (a workspace or a buffer space), controls the wireless module 24, and transmits a controller signal to the game device main body 110 or receives a control signal from the game device main body 110. The wireless module 24 is compatible with the wireless module 14 of the game device main body 110, and modulates a carrier of a predetermined frequency by a controller signal using short-range wireless communication technology, and emits a weak radio wave signal. Also, the microcomputer 23 causes the vibrator 26 to vibrate, according to a control signal from the game device main body 110.

Game processing performed by the game system 1 configured as above will be described. In the following, three types of games will be described as the game of the present embodiment. First, details common to the three types of games will be described, and then, details of each game will be described.

A game executed by the game system 1 is a haunted house game, which is a type of horror game. A player manipulates a player character in a virtual space, and advances in the haunted house set in the virtual space toward the goal. When the player, in the process of advancing along a course in the haunted house, becomes nervous with feelings such as fear, fright, surprise, panic, and anxiety, a nervousness level is detected. The nervousness detected in the process of the player character's advancing along the coarse is displayed on the screen 201, and is accumulated as the accumulated nervousness level. In the game system 1 of the present embodiment, the game device main body 110 judges the nervousness of the player based on a controller signal from the controller 120. Also, when the game is over, the nervousness of the player detected in the process of advancing in the haunted house is presented as a diagnosis result of the player. In the following, a specific explanation will be given with reference to an example of the display screen.

Figure 7:
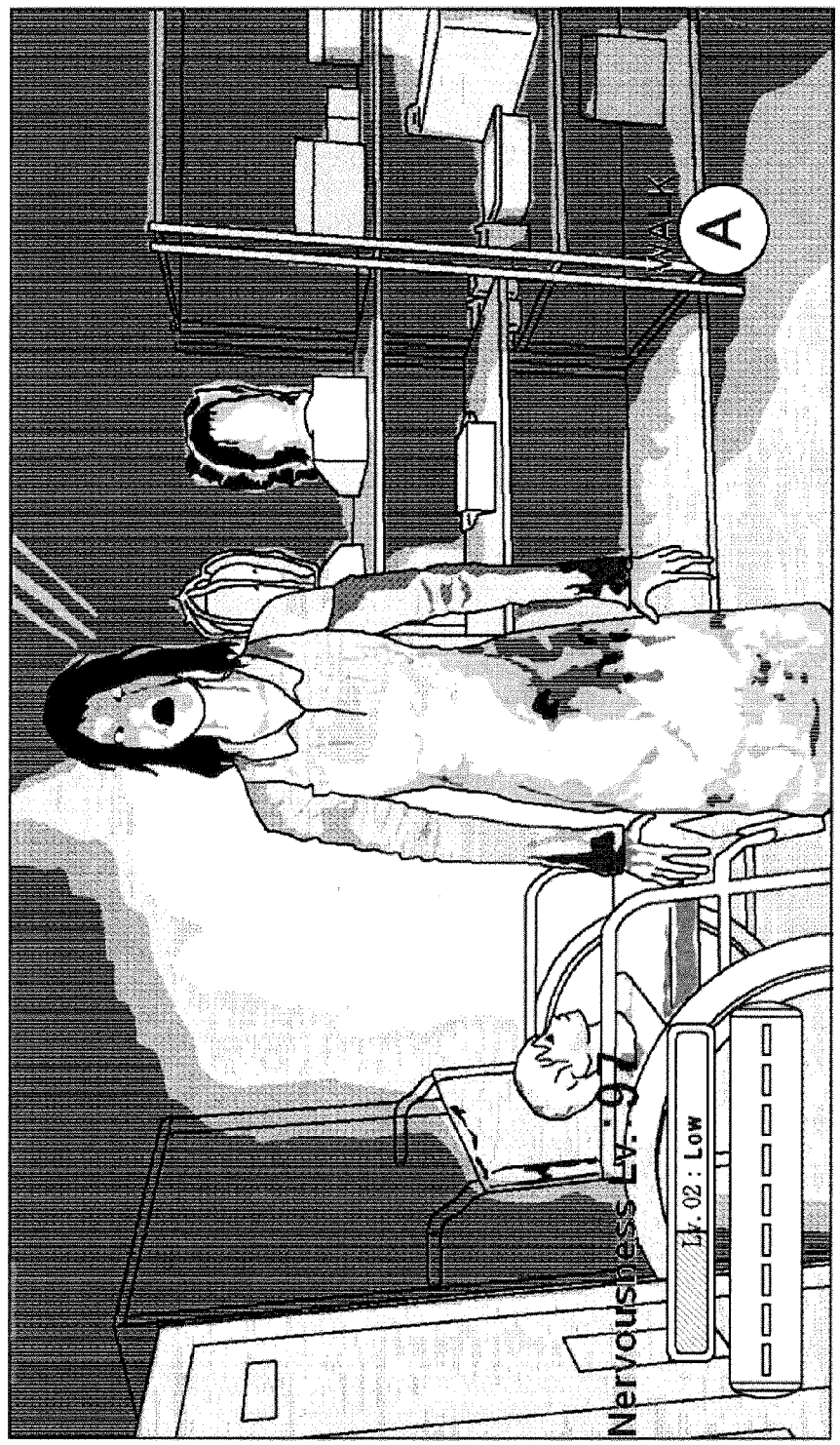
FIG. 7 shows an example non-limiting screen that is displayed on a monitor during a first game.

FIG. 7 shows an example non-limiting screen that is displayed on the monitor 200 during a game. When a game starts, a player can advance a player character in the virtual space by pressing the A-button 1212d of the first controller 121. The route that the player character takes when advancing is determined in advance for each course except for forks where the player is made to select the direction of advancement. Thus, the player character advances when the A-button 1212d is pressed and stops when the pressing of the A-button 1212d is released, but is not allowed to turn back. The scene in the haunted house progresses as the player character advances along the course.

For this process, at the first controller 121, when the A-button 1212d is pressed, a corresponding operation signal is generated at the operation section 21, and the operation signal is transmitted in the form of radio wave from the wireless module 24 via the microcomputer 23. When the wireless module 14 of the game device main body 110 receives this radio wave, the game device main body 110 advances the player character in the virtual space of the game, and outputs corresponding display screen information on the monitor 200.

The player character in the virtual space can look left and right or can look behind according to an operation of the player on the controller 120. The operation of looking left and right can be performed by swinging the first controller 121 or the second controller 122 to the left and right or by pushing the analog joystick 1222a of the second controller 122 to the left and right. The operation of swinging the first controller 121 or the second controller 122 to the left and right, and the operation of pushing the analog joystick 1222a of the second controller 122 to the left and right correspond to the movement of the view of the player character displayed on the monitor 200. Furthermore, sharply swinging the first controller 121 or the second controller 122 allows looking behind.

In the process of advancing along the course, scenes along the course are displayed as seen from the view of the player character. The game device main body 110 generates an event during the game for horror effects according to the scene and/or the nervousness of the player. Specifically, there are ghost characters along the course, and, as the event for horror effects, a ghost character comes into view from outside the view, or a ghost character appears at an empty space.

At the bottom left of the screen, an indicator indicating the nervousness level at the time of judging that the player is feeling nervous, and an accumulated nervousness level which is increased as the nervousness level of the player is accumulated are displayed. Also, when the player is judged as feeling nervous, a number indicating the nervousness level is displayed. For these processes, during progress of the game, the first controller 121 transmits, to the game device main body 110, an operation signal and an acceleration signal generated, respectively, at the operation section 21 and the accelerometer 22 of the first controller 121, and an operation signal and an acceleration signal (that is, a controller signal) generated, respectively, at the operation section 26 and the accelerometer 27 of the second controller 122. The game device main body 110 receives a controller signal from the first controller 121.

This controller signal may include a signal generated by the player intentionally operating the controller 120 to manipulate the player character, and a signal generated by the player unintentionally performing an operation due to feeling nervous. The game device main body 110 identifies, based on a controller signal, whether the controller signal is for manipulating the player character or the controller signal is generated by nervousness, and manipulates the player character or performs processes such as determination of the nervousness level, accumulation, diagnosis and the like, by the method described later. Details of these processes will be described later.

Several levels are set for the accumulated nervousness level, and it is indicated that the higher the accumulated nervousness level, the more often nervousness is greatly felt (the more inclined the player is to feel nervous). On the screen, an instantaneous nervousness level is displayed by an indicator that is in accordance with the magnitude of the level, and the accumulated nervousness level is displayed by a level number and a name corresponding to the level number. Furthermore, at the bottom right of the screen, a sign showing, as a possible operation, that the player character can be advanced by pressing the A-button 1212d is displayed.

Figure 8:
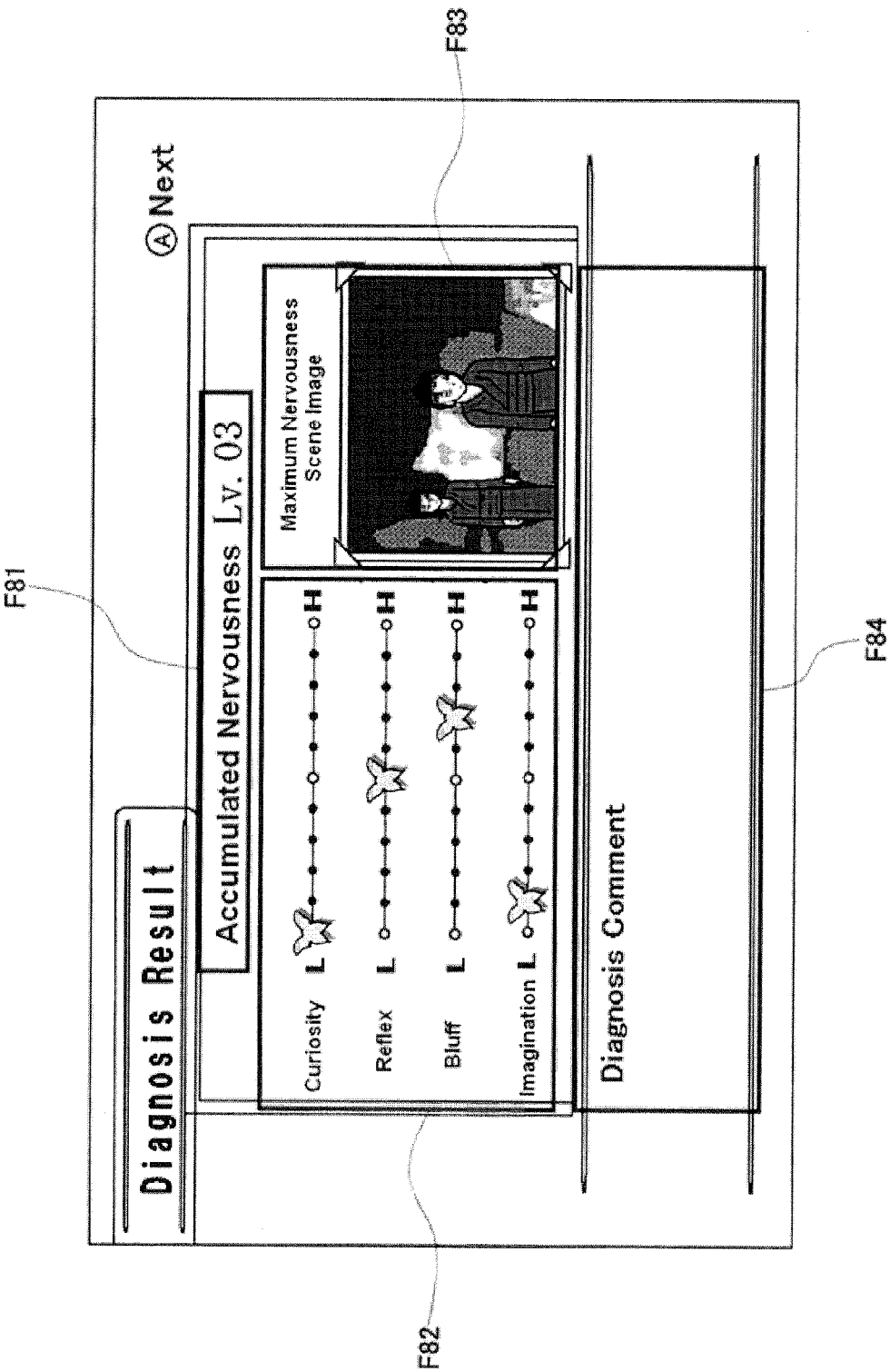
FIG. 8 shows an example non-limiting display screen of a diagnosis result of nervousness of a player (a diagnosis display screen).

FIG. 8 shows an example non-limiting display screen of a diagnosis result of nervousness of the player (a diagnosis display screen). This diagnosis display screen is displayed when the game is over. This diagnosis display screen is provided with four fields. In a first field F81, the accumulated nervousness level at the time of the end of the game is displayed. In a second field F82, scores of "curiosity", "reflex", "bluff" and "imagination", which are categories regarding the characteristics of the player, are displayed as the status obtained based on the nervousness of the player. In a third field F83, an image of a scene where the player was the most nervous in the process of advancing along the course, that is, a scene where the instantaneous nervousness level was the highest, is displayed as a maximum nervousness scene image. In a fourth field F84, an evaluation comment obtained based on the nervousness of the player is displayed as a diagnosis comment. In the following, details of each game will be described.

(First Game)

A first game is a game of trying to reach a goal without feeling scared as much as possible. When the accumulated nervousness level reaches a predetermined upper limit before reaching goal, the game is ended at the instant. That is, the aim of the first game is to advance the player character in the virtual space of the haunted house and reaching the goal before the accumulated nervousness level reaches the upper limit. When a player performs operations as described above on the controller 120 and the player character moves along the course, and the goal is reached before the accumulated nervousness level reaches the upper limit, or the accumulated nervousness level reaches the upper limit before the goal is reached, the game is ended. When the game is ended, a diagnoses result of the player in the game is displayed on the monitor 200.

(Second Game)

A second game is a game of trying to reach a goal while collecting items placed at various places along the course. In the second game, even if the accumulated nervousness level becomes high, the game is not ended thereby. A player presses the B-button 1212h when an item is found along the course to acquire the item. For this process, the game device main body 110 judges whether the position and orientation of the player character are the position and orientation allowing acquisition of the item, and when a controller signal to the effect that the B-button 1212h is pressed is received in the case the position and orientation of the player character are the position and orientation allowing acquisition of the item, the game device main body 110 shores this item in the memory as an acquired item.

In the second game, ghost characters appear at various places along the course as horror effects, and the ghost characters close up from behind in the direction of advancement of the player character. When a ghost character catches up with the player character, the game is ended at the instant. That is, the aim of the second game is to advance in a hurry so as not to be caught up by the ghost character and, at the same time, to collect items placed at various places along the course, and to reach the goal.

The player has to make the player character look behind from time to time to check a ghost character coming closer. If the player character does not look behind for a specific time, the speed of the ghost character coming closer increases. At this time, the vibrator 26 of the first controller 121 operates and makes the player aware of the speeding up of the ghost player. When the player makes the player character look behind, the ghost character stops for a specific time, and then, starts advancing at a normal speed.

For this process, the game device main body 110 counts the time from the last time the player character looked behind, and when the time exceeds a predetermined threshold value, increases the advancing speed of the ghost character, and also, generates a control signal for causing the vibrator 26 to operate. This control signal is wirelessly transmitted to the controller 120 via the wireless module 14. When a control signal for the operation of making the player character look behind is received from the controller 120 after the advancing speed of the ghost character has been increased, the game device main body 110 temporarily causes the ghost character to stop, and after a specific time, causes the ghost character to advance again at a normal speed. When the player character reaches the goal and the game is over, a diagnosis result of the player in the game is displayed on the monitor 200, as with the first game.

(Third Game)

A third game is a game of trying to reach a goal while taking pictures of ghost characters that appear at various places along the course and advancing along the course. As with the second game, with the third game, even if the accumulated nervousness level becomes high, the game is not ended thereby. A player performs photo-shooting (capturing of an image displayed on the monitor as a camera viewfinder the player character is looking through) by pressing down the B-button 1212h at a scene where a ghost character has appeared halfway through the course. For this process, when a controller signal to the effect that the B-button 1212h has been pressed is received, the game device main body 110 captures the screen of that instant.

When the player has performed photo-shooting by pressing the B-button 1212h, the captured image is displayed for a specific time, and furthermore, when photo-shooting has been performed in such a way that the face of the ghost character is in the middle of the photograph, a result "special shot" is displayed, and when a ghost character has been shot but its face is not in the middle, a result "nice shot" is displayed, and when a ghost character has not been shot, a result "missed shot" is displayed. When the player character advances along the course while performing photo-shooting and reaches the goal, the game is ended. When the game is over, a diagnosis result of the player in the game is displayed on the monitor 200, as with the first and second games.

Next, determination of the nervousness of a player will be described. Case types where the nervousness of a player is determined are the following seven case types. These examples will be described below. In the following, the degree of nervousness detected will be expressed as a nervousness parameter.

(1) Detection of unnecessary key: when input of the minus button, the plus button, the 2-button, the C-button, or the Z-button is detected, the nervousness parameter is calculated as each detection. That is, when a button that is not necessary for normal operation for progress of the game is pressed, it as judged that the player is nervous with fear, surprise, panic or the life.

(2) On/Off frequency of A-button: the nervous parameter is calculated according to the number of times of switching between halting and advancing. For example, if an operation of advancing a little and then immediately stopping is repeated, it is judged that the player is nervous with fear or fright.

(3) A-button mashing (during event)/B-button mashing (during event): the nervousness parameter is calculated according to the number of times the A-button or the B-button is pressed during an event (opening of a door, photo-shooting, film development, item acquisition). As in (1), when the player repeats unnecessary button operation, it is judged that the player is nervous.

(4) Time from occurrence of event to pressing of B-button: in the second game, the nervousness parameter is calculated according to the time from the speeding up of the ghost character to the locking behind. Also, in the third game, the nervousness parameter is calculated according to the time from the entering of the ghost character into the viewfinder to the photo-shooting. That is, when judgment is not made instantly because of fear or panic, it is judged that the player is nervous.

(5) Pressing of button without an event (unnecessary pressing, etc.): a nervousness parameter is calculated according to the number of times the B-button is pressed unnecessarily. In the second game, when there is an item, the B-button is pressed to acquire the item, and in the third game, when the ghost character appears, the B-button is pressed to perform photo-shooting. But if the B-button is pressed at other timings (that is, at a timing outside an event), it is judged that the player is nervous with fear or surprise.

(6) Frequency of controller acceleration input: the nervousness parameter is calculated when the controller is greatly tilted. Additionally, the nervousness parameter is calculated only when the gravitational acceleration is 1.5 G or less, and no reaction is obtained for more intense swinging. Furthermore, a nervousness parameter according to the number of times of swinging of the controller (the number of times of detection of centrifugal force) is calculated. At this time, if the gravitational response in the vertical direction is strong, centrifugal force of twice the magnitude is used in calculation.

(7) Frequency of analog joystick input: a nervous parameter according to the number of left and right inputs of the analog joystick is calculated. That the number of left and right inputs of the analog joystick is large means the player is frightened and is looking left and right, and thus, this is calculated as the nervousness parameter.

As described above with the examples (1) to (7), in the present embodiment, a predetermined operation on the controller an defined as an operation performed unintentionally by the player due to being nervous with fear, fright, surprise, and the like, and in the case of judging that such operation has been performed, based on a controller signal transmitted from the controller, the game device main body 110 calculates a nervousness parameter according to the operation.

The nervousness parameter calculated in the above manner is used for determination of the instantaneous nervousness level, accumulation of the nervousness level, determination of the status, determination of the maximum nervousness scene image, and determination of the diagnosis comment. Additionally, not all of the nervousness parameters calculated are used for each of determination of the instantaneous nervousness level, accumulation of the nervousness level, determination of the status, determination of the maximum nervousness scene image, and determination of thee diagnosis comment, and sometimes, only the nervousness parameters of one or some case types are used.

For example, the instantaneous nervousness level is determined based on the nervousness parameters calculated in (1), (3), (5), and (6) described above, the accumulated nervousness level is determined based on the accumulation of all the nervousness parameters calculated in (1) to (7), the score of each item in the status is determined based on a combination of accumulations of nervousness parameters of corresponding case types, and the diagnosis comment is determined by selecting one comment from comments prepared in advance, based on a combination of accumulations of nervousness parameters of corresponding case types.

The maximum nervousness scene image is a captured image of a scene of the moment with the highest level of instantaneous nervousness level. To determine the maximum nervousness scene image, the game device main body 110 captures, and stores in the memory, an image of the moment when the instantaneous nervousness level became the highest as the player moves on with the game, and updates the captured image that is stored every time the maximum instantaneous nervousness level is updated. Then, the captured image that is stored at the end of the game is taken as the maximum nervousness scene image.

As described above, according to the game system 1 of the present embodiment, the controller 120 includes the operating members and the accelerometers, defines various specific operations on the operating members and the accelerometers in scenes of a game as being due to the nervousness of the player, and when such specific operation is detected, calculates the nervousness parameter of the case type corresponding to the operation.

The nervousness parameter of each case type which has been calculated is partly or wholly reflected in specific game processing. Specifically, the instantaneous nervousness level is calculated based on the nervousness parameter of one or some cause types, and is displayed on the screen in the form of a number or an indicator. Also, the accumulated nervousness level is calculated based on the accumulation of all the nervousness parameters, and a process such as ending of the game is performed according to the accumulated nervousness level. Furthermore, a process of diagnosis (determination and display of a status or an evaluation comment) is performed based on the accumulation of the nervousness parameter of one or some case types. Furthermore, processes of storing and displaying a captured image of the moment when the instantaneous nervousness level is the highest are performed based on the nervousness parameter of one or some case types. Examples of reflection of a calculated nervousness parameter in game processing are not limited to the above. For example, the timing or the scene of appearance of a ghost character in the game may be determined based on the calculated nervousness parameter.

Additionally, in the embodiment described above, an unintentional operation of a player on the operating member or the accelerometer provided to the controller as an operation device is detected as the nervousness of the player, but the controller that detects an unintentional operation of a player is not limited to the above. For example, the controller may include a touch sensor, and may detect an unintentional operation of a player on the touch sensor (a touch panel) as the nervousness of the player.

In this case, the calculation method of the nervousness parameter may be the same as the calculation method baaed on the operation on the operating member. For example, as in "(1) Detection of unnecessary key" described above, the nervousness parameter may be calculated by judging that the player is nervous. In a case an operation that is not necessary for normal operation for progress of the game is performed on the touch sensor. Also, as in "(2) On/Off frequency of A-button" described above, the nervousness parameter may be calculated according to the number of times the operation of switching between halting and advancing is performed on the touch sensor. Furthermore, as in "(3) A-button mashing (during event)/B-button mashing (during event)" described above, the nervousness parameter may be calculated according to the number of times the operation of opening a door, photo-shooting, film development, or item acquisition is performed on the touch sensor. Furthermore, as in "(4) Time from occurrence of event to pressing of B-button" described above, the nervousness parameter may be calculated, in the second game, according to the time from the speeding up of the ghost character to the looking behind, or in the third game, according to the time from the entering of the ghost character into the viewfinder. Furthermore, as in "(5) Pressing of button without an event (unnecessary pressing, etc.)" described above, the nervousness parameter may be calculated in a case an operation regarding an event is performed even though no event has occurred.

Furthermore, in the embodiment described above, the nervousness of a player is detected by an unintentional operation of the player on the controller as an operation device, but the nervousness of the player may be detected by a device other than the operation device. For example, the game system 1 may be provided with a biometric information acquisition section such as a plethysmograph for acquiring biometric information of a player, a camera for image-capturing a player and generating an image, or a microphone for acquiring a voice, and the nervousness of the player may be detected by such unit. Each will be described below.

Figure 9:
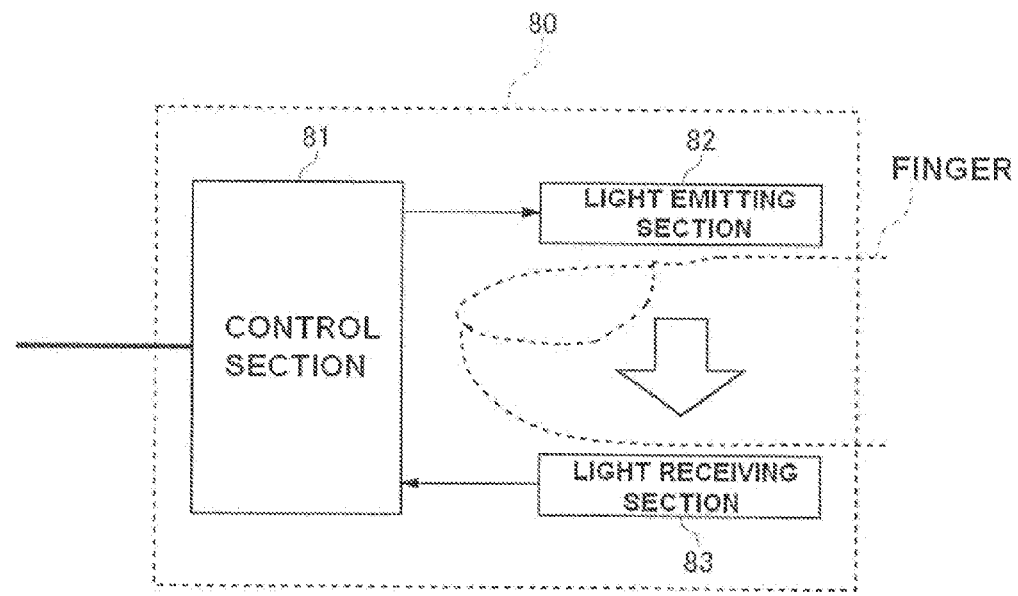
FIG. 9 shows an example non-limiting configuration of a plethysmograph.

FIG. 9 shows an example non-limiting block diagram showing a configuration of a plethysmograph. A plethysmograph 80 as a biometric information acquisition section is connected to the first controller 121. As shown in FIG. 9, the plethysmograph 80 includes a control section 81, a light emitting section 82, and a light receiving section 83. The light emitting section 82 and the light receiving section 83 are an example of a sensor for obtaining a biometric signal of a player, and configure a transmission finger plethysmogram sensor. The light emitting section 82 is configured from an infrared LED, for example, and emits infrared light of a predetermined wavelength (for example, 940 nm) toward the light receiving section 83. For its part, the light receiving section 83 receives emitted light according to the wavelength emitted by the light emitting section 82, and is configured from a photoresistor, for example. The light emitting section 82 and the light receiving section 83 are arranged with a predetermined gap (hollow).

Figure 10:
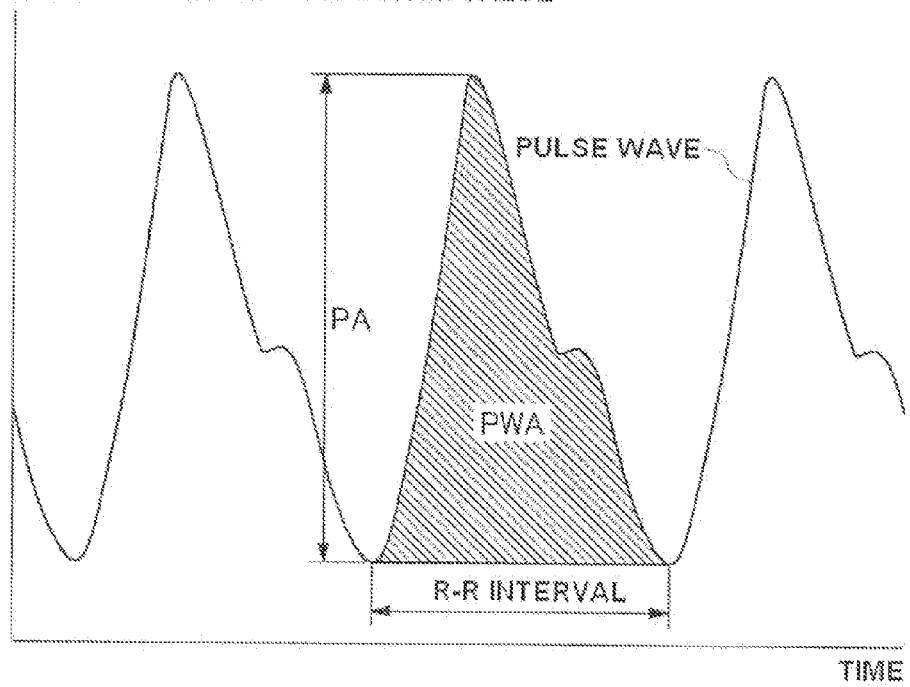
FIG. 10 shows an example non-limiting graph of a pulse wave.

The plethysmograph 80 converts the light amount of the infrared light received by the light receiving section 83 into a photoelectric signal, and thereby detects the pulse (pulse nave) of a human body. For example, as shown in FIG. 10, if the amount of blood flowing through a finger that is inserted increases, the detection value of the light receiving section 83 increases, and if the amount of blood flowing through a finger that is inserted decreases, the detection value of the light receiving section 83 decreases. In FIG. 10, PA is the amplitude of the pulse wave, and R-R interval indicates the cycle of the pulse wave.

The control section 81 is configured from an MCU (Micro Controller Unit), for example. The control section 81 controls the amount of infrared light emitted from the light emitting section 82. Also, the control section 81 AD-converts a photoelectric signal (pulse wave signal) output from the tight receiving section 83, and generates pulse wave data as biometric information data. Then, the control section 81 outputs the pulse wave data (the biometric information data) to the first controller 121 via a connection cable 79. The pulse wave data is transmitted to the game device main body 110 from the wireless module 24 of the first controller 121.

The game device main body 110 calculates a nervousness parameter based on the pulse wave data. Specifically, the game device main body 110 calculates a nervousness parameter according to the magnitude of the amount of change in the pulse wave data. More specifically, the game device main body 110 extracts the amplitude and frequency of a pulse wave from the poise wave data, and calculates a nervousness parameter according to their amounts of change. Additionally, the nervousness parameter may be calculated based on only one of the amplitude and frequency of the pulse wave.

The plethysmograph 80 may be attached to a finger of a player (a bystander player) different from a player (operating player) operating the controller. In this case, game processing is performed based on the degree of nervousness of the bystander player. Also, the biometric information acquisition section is not limited to a plethysmograph. The biometric information acquisition section may acquire biometric information other than the pulse wave, such as sweating of a player, brain waves of a player, or the like.

Figure 11:
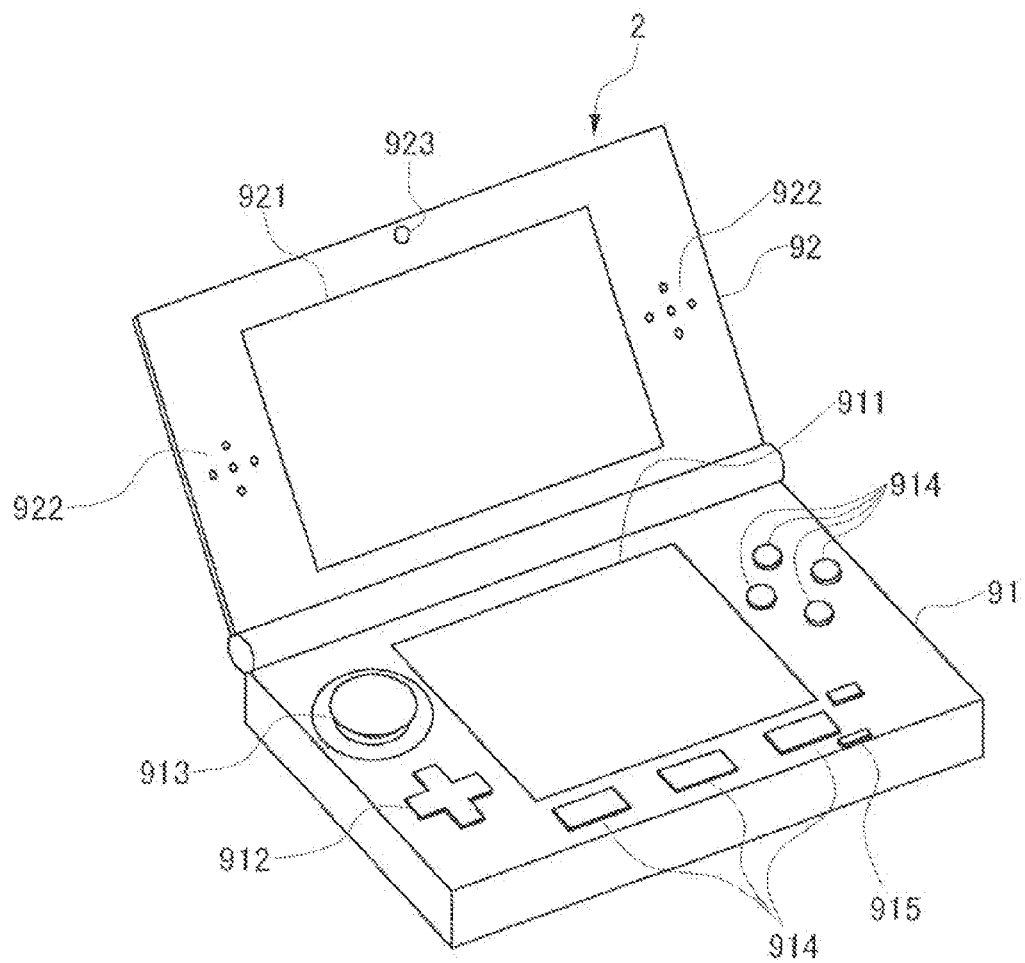
FIG. 11 shows an example non-limiting game system including a camera and a microphone.

FIG. 11 shows an example non-limiting game system including a camera for image-capturing a player and generating an image, and a microphone for acquiring a voice. As shown in FIG. 11, this game system 2 is a portable game device in which an operation device, a game device main body and a monster are integrated. A main body 91 has a touch panel 911 at the center, and a cross key 912, a slide pad 913, and various operation buttons 914 are provided around the touch panel 911. Also, a microphone 910 is provided as a microphone at the lower side of the touch panel 911. A monitor 921 is provided at the center of a monitor section 92, and speakers 922 ere provided at both sides of the monitor 921, and a camera 923 is provided as a camera at the upper side of the monitor 921.

Figure 12:
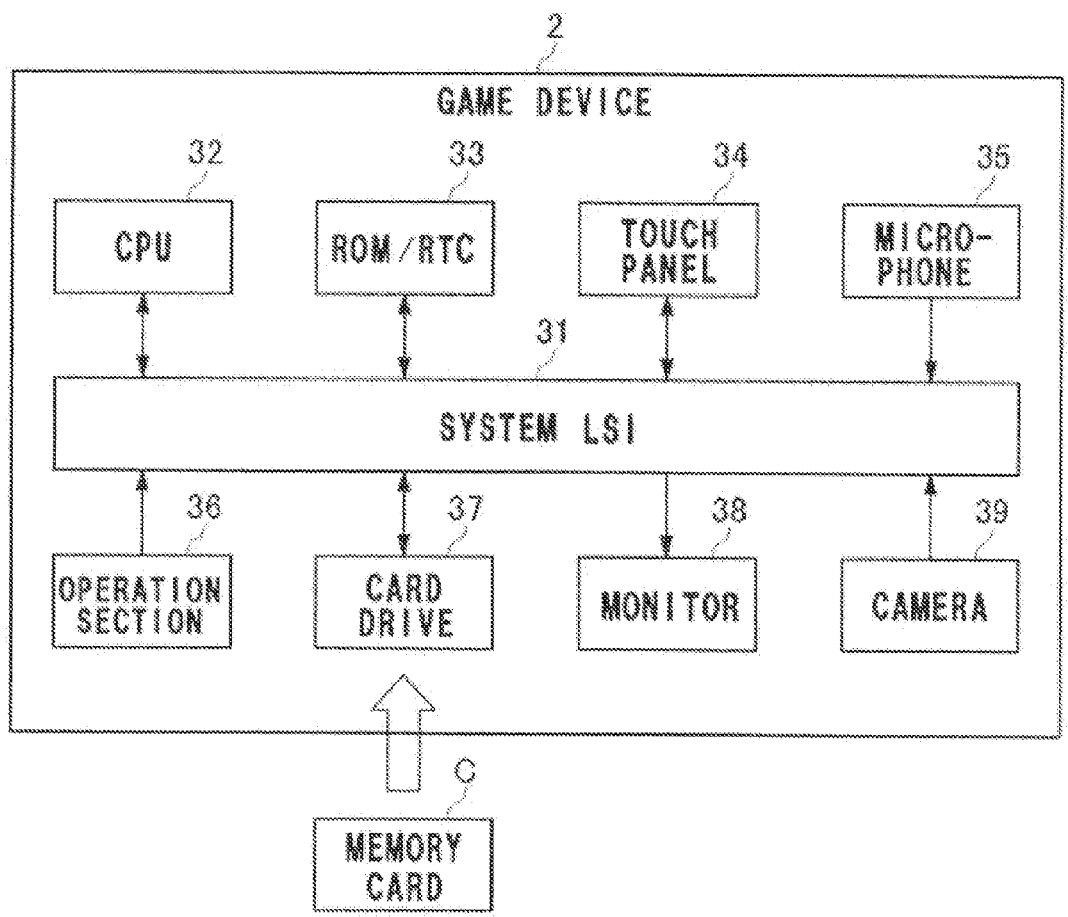
FIG. 12 shows an example non-limiting configuration of a game system of a modification.

FIG. 12 shows an example non-limiting block diagram showing a configuration of the game system 2. As shown in FIG. 12, the game system 2, like the game system 1 described above, includes a system LSI 31, a CPU 32, and a ROM/RTC 33. The game system 2 further includes a touch panel 34, a microphone 35, an operation section 36, a card drive 37, a monitor 38, and a camera 39. The touch panel 34, the microphone 35, the monitor 38, and the camera 39 correspond to the touch panel 911, the microphone 915, the monitor 921, and the camera 923 of FIG. 11, respectively. Furthermore, the operation section 36 corresponds to the operating members including the cross key 912, the slide pad 913, and the various operation buttons 914 of FIG. 11.

The system LSI 31 performs processes such as control of data transmission between structural elements connected thereto, generation of images to be displayed, acquisition of data from an external device, and the like. The CPU 32 is for performing game processing by executing a game program stored in a memory card C, and functions as a game processor. The ROM/RTC 33 is configured from a ROM (a boot ROM) in which a startup program for the game system 2 is embedded, and a clock circuit RTC for counting time.

The touch panel 34 performs display of images under the control of the system LSI 31, and also, detects contact of a stylus and generates an operation signal indicating the contacted part. The microphone 35 converts the surrounding sound of the game system 2 into an audio signal. The operation section 36 generates an operation signal according to an operation on each operating member. The card drive 37 reads program data, texture data and the like from the memory card C, and writes the data which has been read in a memory of the system LSI 31. The monitor 38 displays an image according to an instruction from the system LSI 31. The camera 39 generates an image (a video) by image-capturing.

When a game is started, the camera 39 starts image-capturing the player, and the microphone 35 starts collecting a voice. The system LSI 31 calculates the nervousness parameter of the player in the manner described above based on operation signals from the operation section 36 and the touch panel 34, and also, calculates the nervousness parameter based on an image of the player generated by the camera 39 and an audio signal acquired by the microphone 35.

For example, if the player makes a movement of lurching backward, this is detected based on an image of the player generated by the camera 39, and the nervousness parameter is calculated. The system LSI 31 may recognize a face from an image of the player, and calculate the nervousness parameter based on the change in expression of the recognized face. Also, the system LSI 31 calculates the nervousness parameter based on an audio signal generated by the microphone 35, when the volume exceeds a predetermined threshold value. The system LSI 31 may calculate the nervousness parameter when the amount of change in the volume exceeds a predetermined threshold value. That is, when, the player involuntarily cries out with surprise, the system LSI 31 detects it as the nervousness of the player.

As described above, the nervousness parameter may be calculated with the nervousness of a player being detected based not on the operation on the operation device, but on the image or the voice of the player. The method of reflecting the calculated parameter in the game processing may be the same as that described above. Detection of the nervousness based on the image or the voice of the player may be performed together with detection of the nervousness based the operation on the operation device described above, or only the detection of the nervousness based on the image of the player and/or the detection of the nervousness based on the voice may be performed.

Additionally, in the explanation above, an example of detecting the nervousness of a player based on the image or the voice of the player has been described taking tare game system 2, which is a portable game device, as an example, but the game system 1 including the floor-standing game device 100 shown in FIG. 1 may also be configured to detect the nervousness of the player based on the image or the voice of the player. For example, by installing a cameras and a microphone in the monitor 200, in the game system 1 of FIG. 1, and connecting the camera and the microphone to the game device main body 110, a games system similar to the game system 2 shown in FIG. 12 can be realized.

As described above, according to the game system 1 or the game system 2 of the present embodiment, the degree of nervousness of a player is determined based on an operation of the player on the operating member of the operation device, an image of the player captured by the camera, the voice of the player collected by the microphone, or the like, and thus, when the player becomes nervous with fear, fright, surprise, or the like in a scene of a game, this can be reflected in the game.

While the non-limiting example embodiments have been described in detail, the foregoing description is in all aspects illustrative and not restrictive. It will be understood that numerous other modifications and variations can be devised without departing from the scope of the invention.

What is claimed is:

1. A game system performing game processing based on an operation of a player on an operation device including an operating member, comprising:
   a game processor for performing the game processing based on the operation of the player on the operation device; and
   a parameter calculator for calculating, in a scene of a game, a parameter indicating a degree of nervousness of the player in the scene based on an operation of the player on the operating member,
   wherein the parameter calculator calculates the parameter in such a way that the degree of nervousness increases according to the number of predetermined operations of the player on the operating member, the number of operations of the player on the operating member that are irrelevant to progress of the game, and/or, in a case an event requiring a predetermined operation on the operating member occurs, time from the occurrence of the event to performance of the corresponding predetermined operation, and
   wherein the game processor reflects the parameter in the game processing.

2. The game system according to claim 1, wherein the game processor performs predetermined processing according to magnitude of the degree of nervousness indicated by the parameter.

3. The game system according to claim 1, wherein the game processor causes a diagnosis result of the player regarding nervousness to be presented based on the parameter.

4. The game system according to claim 1, wherein the game processor stores an image of a scene where the player is determined to have become nervous based on the parameter.

5. A game system performing game processing based on an operation of a player on an operation device including an accelerometer, comprising:
   a game processor for performing the game processing based on the operation of the player on the operation device; and
   a parameter calculator for calculating, in a scene of a game, a parameter indicating a degree of nervousness of the player in the scene based on acceleration detected by the accelerometer,
   wherein the parameter calculator calculates the parameter in such a way that the degree of nervousness increases according to the number of times acceleration equal to or exceeding a predetermined threshold value is detected with respect to a predetermined direction, and/or magnitude of detected acceleration in a predetermined direction, and
   wherein the game processor reflects the parameter in the game processing.

6. A game system performing game processing based on an operation of a player on an operation device, comprising:
   a game processor for performing the game processing based on the operation of the player on the operation device;
   a biometric information acquisition section for acquiring biometric information of the player; and
   a parameter calculator for calculating, in a scene of a game, a parameter indicating a degree of nervousness of the player in the scene based on the biometric information acquired by the biometric information acquisition section,
   wherein the parameter calculator calculates the parameter in such a way that the degree of nervousness increases according to an amount of change in the biometric information acquired by the biometric information acquisition section, and
   wherein the game processor reflects the parameter in the game processing.

7. The game system according to claim 6,
   wherein the biometric information acquisition section is a plethysmograph, and
   wherein the parameter calculator calculates the parameter in such a way that the degree of nervousness increases in a case an amount of change in amplitude and/or in a frequency of a pulse wave is great.

8. A game system performing game processing based on an operation of a player on an operation device, comprising:
   a game processor for performing the game processing based on the operation of the player on the operation device;
   a camera for image-capturing the player and generating an image; and a parameter calculator for calculating, in a scene of a game, a parameter indicating a degree of nervousness of the player in the scene based on the image generated by the camera, wherein the game processor reflects the parameter in the game processing.

9. A game system performing game processing based on an operation of a player on an operation device, comprising:

a game processor for performing the game processing based on the operation of the player on the operation device;

a microphone for acquiring a voice; and a parameter calculator for calculating, in a scene of a game, a parameter indicating a degree of nervousness of the player in the scene based on the voice acquired by the microphone, wherein the parameter calculator calculates the parameter in such a way that the degree of nervousness increases according to volume and/or an amount of change in the voice acquired by the microphone, and wherein the game processor reflects the parameter in the game processing.

10. A game system performing game processing based on an operation of a player on a touch sensor, comprising:

a game processor for performing the game processing based on the operation of the player on the touch sensor; and a parameter calculator for calculating, in a scene of a game, a parameter indicating a degree of nervousness of the player in the scene based on contact detected by the touch sensor, wherein the parameter calculator calculates the parameter in such a way that the degree of nervousness increases according to the number of predetermined operations of the player on the touch sensor, the number of operations of the player on the touch sensor that are irrelevant to progress of the game, and/or, in a case an event requiring a predetermined operation on the touch sensor occurs, time from the occurrence of the event to performance of the corresponding predetermined operation, and wherein the game processor reflects the parameter in the game processing.

11. A game processing method for performing game processing based on an operation of a player on an operation device including an operating member, comprising:

performing the game processing based on the operation of the player on the operation device; and calculating, in a scene of a game, a parameter indicating a degree of nervousness of the player in the scene based on an operation of the player on the operating member, wherein the calculating step calculates the parameter in such a way that the degree of nervousness increases according to the number of predetermined operations of the player on the operating member, the number of operations of the player on the operating member that are irrelevant to progress of the game, and/or, in a case an event requiring a predetermined operation on the operating member occurs, time from the occurrence of the event to performance of the corresponding predetermined operation, and wherein the performing step reflects the parameter in the game processing.

12. A game processing method for performing game processing based on an operation of a player on an operation device including an accelerometer, comprising:

performing the game processing based on the operation of the player on the operation device; and calculating, in a scene of a game, a parameter indicating a degree of nervousness of the player in the scene based on acceleration detected by the accelerometer, wherein the calculating step calculates the parameter in such a way that the degree of nervousness increases according to the number of times acceleration equal to or exceeding a predetermined threshold value is detected with respect to a predetermined direction, and/or magnitude of detected acceleration in a predetermined direction, and wherein the performing step reflects the parameter in the game processing.

13. A game processing method for performing game processing based on an operation of a player on an operation device, comprising:

performing the game processing based on the operation of the player on the operation device;

acquiring biometric information of the player; and calculating, in a scene of a game, a parameter indicating a degree of nervousness of the player in the scene based on the biometric information acquired in the acquiring step, wherein the calculating step calculates the parameter in such a way that the degree of nervousness increases according to an amount of change in the biometric information acquired in the acquiring step, and wherein the performing step reflects the parameter in the game processing.

14. A game processing method for performing game processing based on an operation of a player on an operation device, comprising:

performing the game processing based on the operation of the player on the operation device;

image-capturing the player and generating an image; and calculating, in a scene of a game, a parameter indicating a degree of nervousness of the player in the scene based on the image generated in the image-capturing step, wherein the performing step reflects the parameter in the game processing.

15. A game processing method for performing game processing based on an operation of a player on an operation device, comprising:

performing the game processing based on the operation of the player on the operation device;

acquiring a voice; and calculating, in a scene of a game, a parameter indicating a degree of nervousness of the player in the scene based on the voice acquired in the acquiring step, wherein the calculating step calculates the parameter in such a way that the degree of nervousness increases according to volume and/or an amount of change in the voice acquired in the acquiring step, and wherein the performing step reflects the parameter in the game processing.

16. A game processing method for performing game processing based on an operation of a player on an operation device including a touch sensor, comprising:

performing the game processing based on the operation of the player on the operation device; and calculating, in a scene of a game, a parameter indicating a degree of nervousness of the player in the scene based on contact detected by the touch sensor, wherein the calculating step calculates the parameter in such a way that the degree of nervousness increases according to the number of predetermined operations of the player on the touch sensor, the number of operations of the player on the touch sensor that are irrelevant to progress of the game, and/or, in a case an event requiring a predetermined operation on the touch sensor occurs, time from the occurrence of the event to performance of the corresponding predetermined operation, and wherein the performing step reflects the parameter in the game processing.

17. A game device performing game processing based on an operation of a player on an operation section including an operating member, comprising:

a game processor for performing the game processing based on the operation of the player on the operation section; and a parameter calculator for calculating, in a scene of a game, a parameter indicating a degree of nervousness of the player in the scene based on an operation of the player on the operating member, wherein the parameter calculator calculates the parameter in such a way that the degree of nervousness increases according to the number of predetermined operations of the player on the operating member, the number of operations of the player on the operating member that are irrelevant to progress of the game, and/or, in a case an event requiring a predetermined operation on the operating member occurs, time from the occurrence of the event to performance of the corresponding predetermined operation, and wherein the game processor reflects the parameter in the game processing.

18. A game device performing game processing based on an operation of a player on an operation section including an accelerometer, comprising:

a game processor for performing the game processing based on the operation of the player on the operation section; and a parameter calculator for calculating, in a scene of a game, a parameter indicating a degree of nervousness of the player in the scene based on acceleration detected by the accelerometer, wherein the parameter calculator calculates the parameter in such a way that the degree of nervousness increases according to the number of times acceleration equal to or exceeding a predetermined threshold value is detected with respect to a predetermined direction, and/or magnitude of detected acceleration in a predetermined direction, and wherein the game processor reflects the parameter in the game processing.

19. A game device performing game processing based on an operation of a player on an operation section, comprising:

a game processor for performing the game processing based on the operation of the player on the operation section;

a biometric information acquisition section for acquiring biometric information of the player; and a parameter calculator for calculating, in a scene of a game, a parameter indicating a degree of nervousness of the player in the scene based on the biometric information acquired by the biometric information acquisition section, wherein the parameter calculator calculates the parameter in such a way that the degree of nervousness increases according to an amount of change in the biometric information acquired by the biometric information acquisition section, and wherein the game processor reflects the parameter in the game processing.

20. A game device performing game processing based on an operation of a player on an operation section, comprising:

a game processor for performing the game processing based on the operation of the player on the operation section;

a camera for image-capturing the player and generating an image; and a parameter calculator for calculating, in a scene of a game, a parameter indicating a degree of nervousness of the player in the scene based on the image generated by the camera, wherein the game processor reflects the parameter in the game processing.

21. A game device performing game processing based on an operation of a player on an operation section, comprising:

a game processor for performing the game processing based on the operation of the player on the operation section;

a microphone for acquiring a voice; and a parameter calculator for calculating, in a scene of a game, a parameter indicating a degree of nervousness of the player in the scene based on the voice acquired by the microphone, wherein the parameter calculator calculates the parameter in such a way that the degree of nervousness increases according to volume and/or an amount of change in the voice acquired by the microphone, and wherein the game processor reflects the parameter in the game processing.

22. A game device performing game processing based on an operation of a player on a touch sensor, comprising:

a game processor for performing the game processing based on the operation of the player on the touch sensor; and a parameter calculator for calculating, in a scene of a game, a parameter indicating a degree of nervousness of the player in the scene based on contact detected by the touch sensor, wherein the parameter calculator calculates the parameter in such a way that the degree of nervousness increases according to the number of predetermined operations of the player on the touch sensor, the number of operations of the player on the touch sensor that are irrelevant to progress of the game, and/or, in a case an event requiring a predetermined operation on the touch sensor occurs, time from the occurrence of the event to performance of the corresponding predetermined operation, and wherein the game processor reflects the parameter in the game processing.

23. A non-transitory computer-readable storage medium having stored therein a game program causing a computer of a game device performing game processing based on an operation of a player on an operation device including an operating member to provide functionality comprising:

a performance of the game processing based on the operation of the player on the operation device; and a parameter calculation for calculating, in a scene of a game, a parameter indicating a degree of nervousness of the player in the scene based on an operation of the player on the operating member, wherein the parameter calculation calculates the parameter in such a way that the degree of nervousness increases according to the number of predetermined operations of the player on the operating member, the number of operations of the player on the operating member that are irrelevant to progress of the game, and/or, in a case an event requiring a predetermined operation on the operating member occurs, time from the occurrence of the event to performance of the corresponding predetermined operation, and wherein the parameter is reflected in the game processing.

24. A non-transitory computer-readable storage medium having stored therein a game program causing a computer of a game device performing game processing based on an operation of a player on an operation device including an accelerometer to provide functionality comprising:

a performance of the game processing based on the operation of the player on the operation device; and a parameter calculation for calculating, in a scene of a game, a parameter indicating a degree of nervousness of the player in the scene based on acceleration detected by the accelerometer, wherein the parameter calculation calculates the parameter in such a way that the degree of nervousness increases according to the number of times acceleration equal to or exceeding a predetermined threshold value is detected with respect to a predetermined direction, and/or magnitude of detected acceleration in a predetermined direction, and wherein the parameter is reflected in the game processing.

25. A non-transitory computer-readable storage medium having stored therein a game program causing a computer of a game device performing game processing based on an operation of a player on an operation device to provide functionality comprising:

a performance of the game processing based on the operation of the player on the operation device;

a biometric information acquisition for acquiring biometric information of the player; and a parameter calculation for calculating, in a scene of a game, a parameter indicating a degree of nervousness of the player in the scene based on the biometric information acquired by the biometric information acquisition, wherein the parameter calculation calculates the parameter in such a way that the degree of nervousness increases according to an amount of change in the biometric information acquired by the biometric information acquisition, and wherein the parameter is reflected in the game processing.

26. A non-transitory computer-readable storage medium having stored therein a game program causing a computer of a game device performing game processing based on an operation of a player on an operation device to provide functionality comprising:

a performance of the game processing based on the operation of the player on the operation device;

an image-capture of the player and a generation of an image; and a parameter calculation for calculating, in a scene of a game, a parameter indicating a degree of nervousness of the player in the scene based on the captured image, wherein the parameter is reflected in the game processing.

27. A non-transitory computer-readable storage medium having stored therein a game program causing a computer of a game device performing game processing based on an operation of a player on an operation device to provide functionality comprising:

a performance of the game processing based on the operation of the player on the operation device;

a voice acquisition; and a parameter calculation for calculating, in a scene of a game, a parameter indicating a degree of nervousness of the player in the scene based on the voice acquired by the voice acquisition, wherein the parameter calculation calculates the parameter in such a way that the degree of nervousness increases according to volume and/or an amount of change in the voice acquired by the voice acquisition, and wherein the parameter is reflected in the game processing.

28. A non-transitory computer-readable storage medium having stored therein a game program causing a computer of a game device performing game processing based on an operation of a player on a touch sensor to provide functionality comprising:

a performance of the game processing based on the operation of the player on the touch sensor; and a parameter calculation for calculating, in a scene of a game, a parameter indicating a degree of nervousness of the player in the scene based on contact detected by the touch sensor, wherein the parameter calculation calculates the parameter in such a way that the degree of nervousness increases according to the number of predetermined operations of the player on the touch sensor, the number of operations of the player on the touch sensor that are irrelevant to progress of the game, and/or, in a case an event requiring a predetermined operation on the touch sensor occurs, time from the occurrence of the event to performance of the corresponding predetermined operation, and wherein the parameter is reflected in the game processing.

* * * * *